(12) United States Patent
Tsujie

(10) Patent No.: US 11,174,534 B2
(45) Date of Patent: Nov. 16, 2021

(54) HIGH STRENGTH TITANIUM COPPER STRIP AND FOIL HAVING LAYERED STRUCTURE

(71) Applicant: JX Nippon Mining & Metals Corporation, Tokyo (JP)

(72) Inventor: Kenta Tsujie, Kanagawa (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 165 days.

(21) Appl. No.: 16/498,527

(22) PCT Filed: Mar. 12, 2018

(86) PCT No.: PCT/JP2018/009586
§ 371 (c)(1),
(2) Date: Sep. 27, 2019

(87) PCT Pub. No.: WO2018/180428
PCT Pub. Date: Oct. 4, 2018

(65) Prior Publication Data
US 2020/0024698 A1    Jan. 23, 2020

(30) Foreign Application Priority Data

Mar. 30, 2017    (JP) .............................. JP2017-068704

(51) Int. Cl.
*C22C 14/00* (2006.01)
*C22C 9/00* (2006.01)
(Continued)

(52) U.S. Cl.
CPC ................ *C22C 14/00* (2013.01); *C22C 9/00* (2013.01); *C22F 1/08* (2013.01); *G02B 7/026* (2013.01); *G03B 3/10* (2013.01); *G03B 13/36* (2013.01)

(58) Field of Classification Search
None
See application file for complete search history.

(56) References Cited

U.S. PATENT DOCUMENTS

2004/0042928 A1    3/2004  Sasaki et al.
2010/0132851 A1    6/2010  Gao et al.
(Continued)

FOREIGN PATENT DOCUMENTS

EP    3088541 A1 * 11/2016 ............... C22C 9/00
JP    2004-160543 A    6/2004
(Continued)

OTHER PUBLICATIONS

English language machine translation of JP2015127438 to Horie. Generated May 6, 2021. (Year: 2021).*

(Continued)

*Primary Examiner* — Brian D Walck
(74) *Attorney, Agent, or Firm* — Marshall, Gerstein & Borun LLP

(57) ABSTRACT

A titanium copper according to the present invention contains from 1.5 to 5.0% by mass of Ti, the balance being of Cu and inevitable impurities, wherein the titanium copper has a layered structure of Cu and Ti where in a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in the thickness direction, and wherein in the cross section parallel to the rolling direction, a Ti concentration difference in the layered structure is 3% by mass or more, the Ti concentration difference being a difference between a maximum value of the Ti concentration (Continued)

in the higher concentration Ti layer and a minimum value of the Ti concentration in the lower concentration Ti layer.

7 Claims, 7 Drawing Sheets

(51) Int. Cl.
*C22F 1/08* (2006.01)
*G02B 7/02* (2021.01)
*G03B 13/36* (2021.01)
*G03B 3/10* (2021.01)

(56) References Cited

U.S. PATENT DOCUMENTS

| | | | |
|---|---|---|---|
| 2016/0304990 | A1 | 10/2016 | Horie |
| 2016/0326611 | A1 | 11/2016 | Horie |

FOREIGN PATENT DOCUMENTS

| | | | |
|---|---|---|---|
| JP | 2004-280031 | A | 10/2004 |
| JP | 4001491 | B2 | 10/2007 |
| JP | 4259828 | B2 | 2/2009 |
| JP | 2009-115895 | A | 5/2009 |
| JP | 2010-126777 | A | 6/2010 |
| JP | 2011-208243 | A | 10/2011 |
| JP | 2014-074193 | A | 4/2014 |
| JP | 5526212 | B2 | 6/2014 |
| JP | 2014-173145 | A | 9/2014 |
| JP | 2015-096642 | A | 5/2015 |
| JP | 2015/098622 | A | 5/2015 |
| JP | 5723849 | B2 | 5/2015 |
| JP | 2015-127438 | A | 7/2015 |
| JP | 2015127440 | A | 7/2015 |
| JP | 2016130370 | A | 7/2016 |
| JP | 2016138334 | A | 8/2016 |
| KR | 2016-0096696 | A | 8/2016 |
| WO | WO-2014/064969 | A1 | 5/2014 |
| WO | WO-2014/064970 | A1 | 5/2014 |
| WO | WO-2015/072221 | A1 | 5/2015 |

OTHER PUBLICATIONS

Extended European Search Report in European Application No. 18778237.0 dated Sep. 15, 2020, 8 pages.
International Preliminary Report on Patentability and Written Opinion in International Application No. PCT/JP2018/009586 dated Oct. 10, 2019, 8 pages.
Office Action in Korean Patent Application No. 2019-7030405 dated Nov. 27, 2020, 4 pages.
Search Report in International Application No. PCT/JP2018/009586 dated Jun. 5, 2018, 4 pages.

* cited by examiner

[FIG. 1]
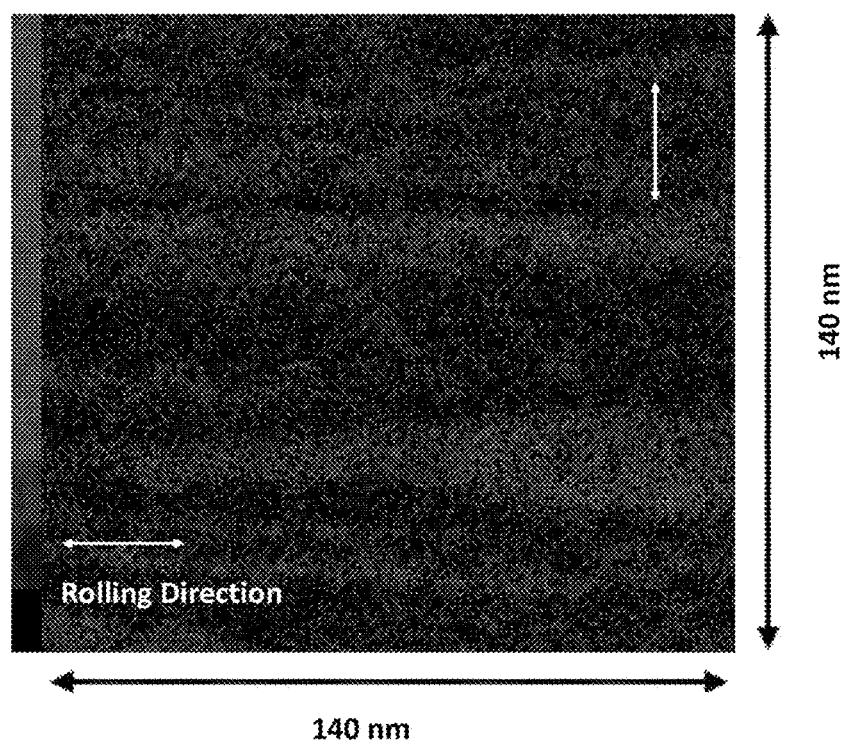

[FIG. 2]
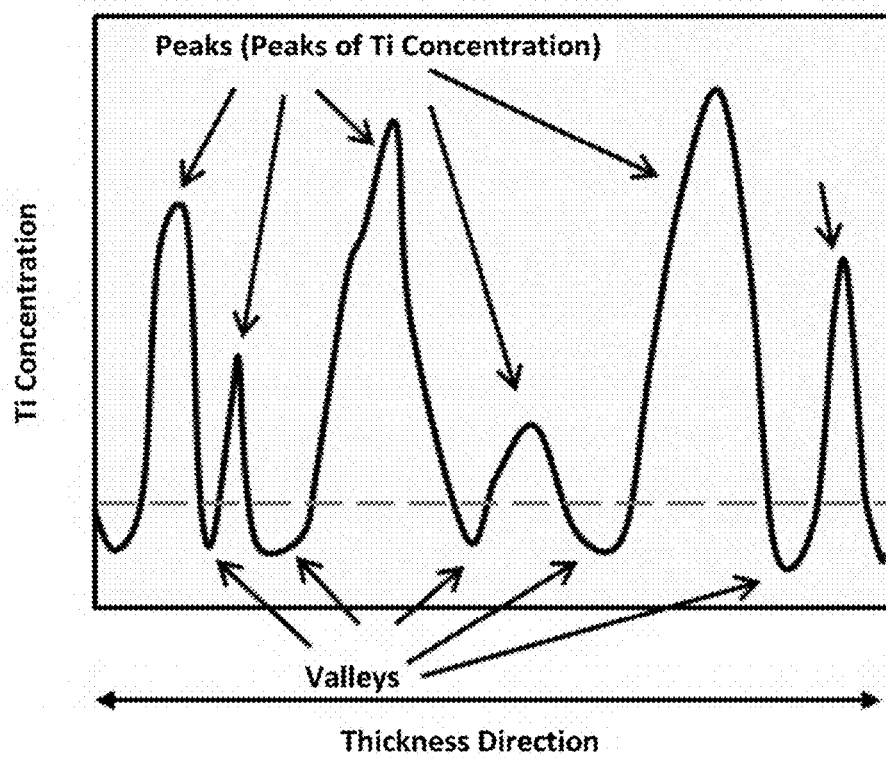

[FIG. 3]
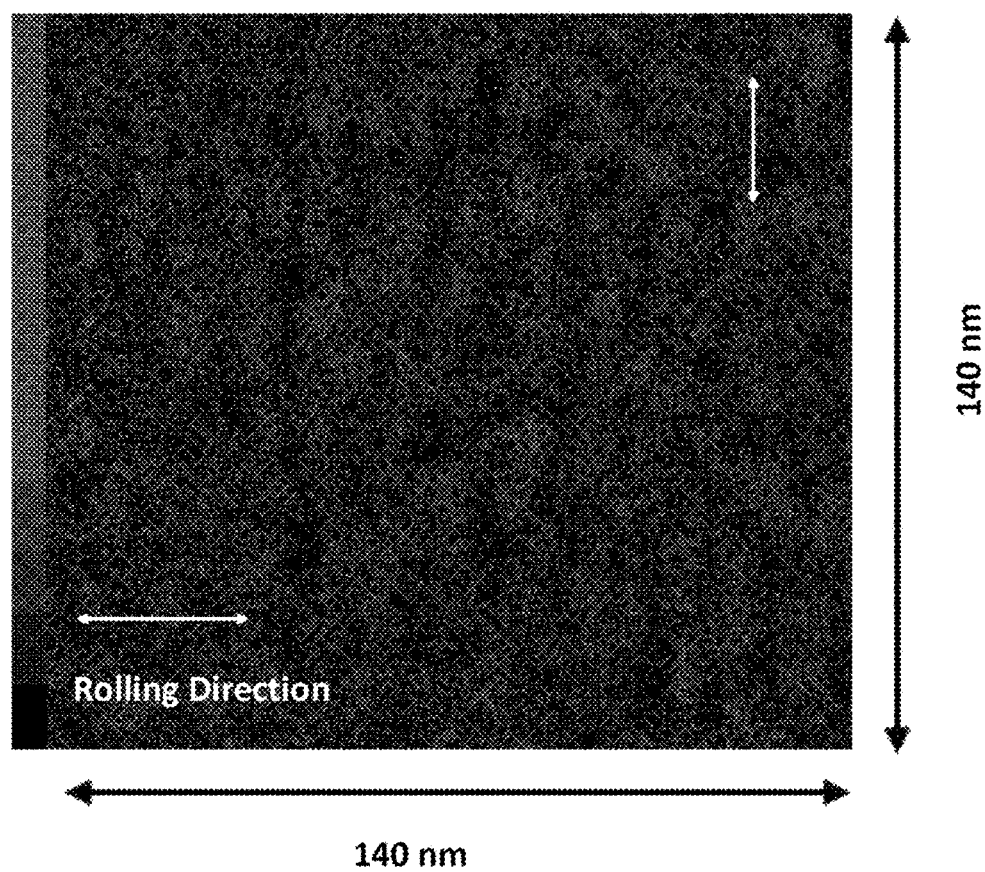

[FIG. 4]
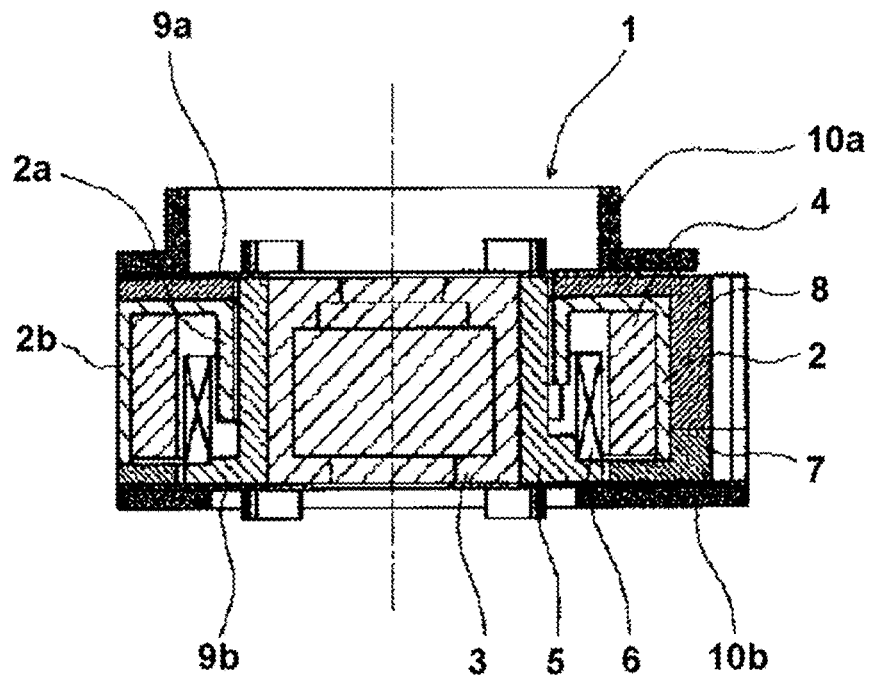

[FIG. 5]
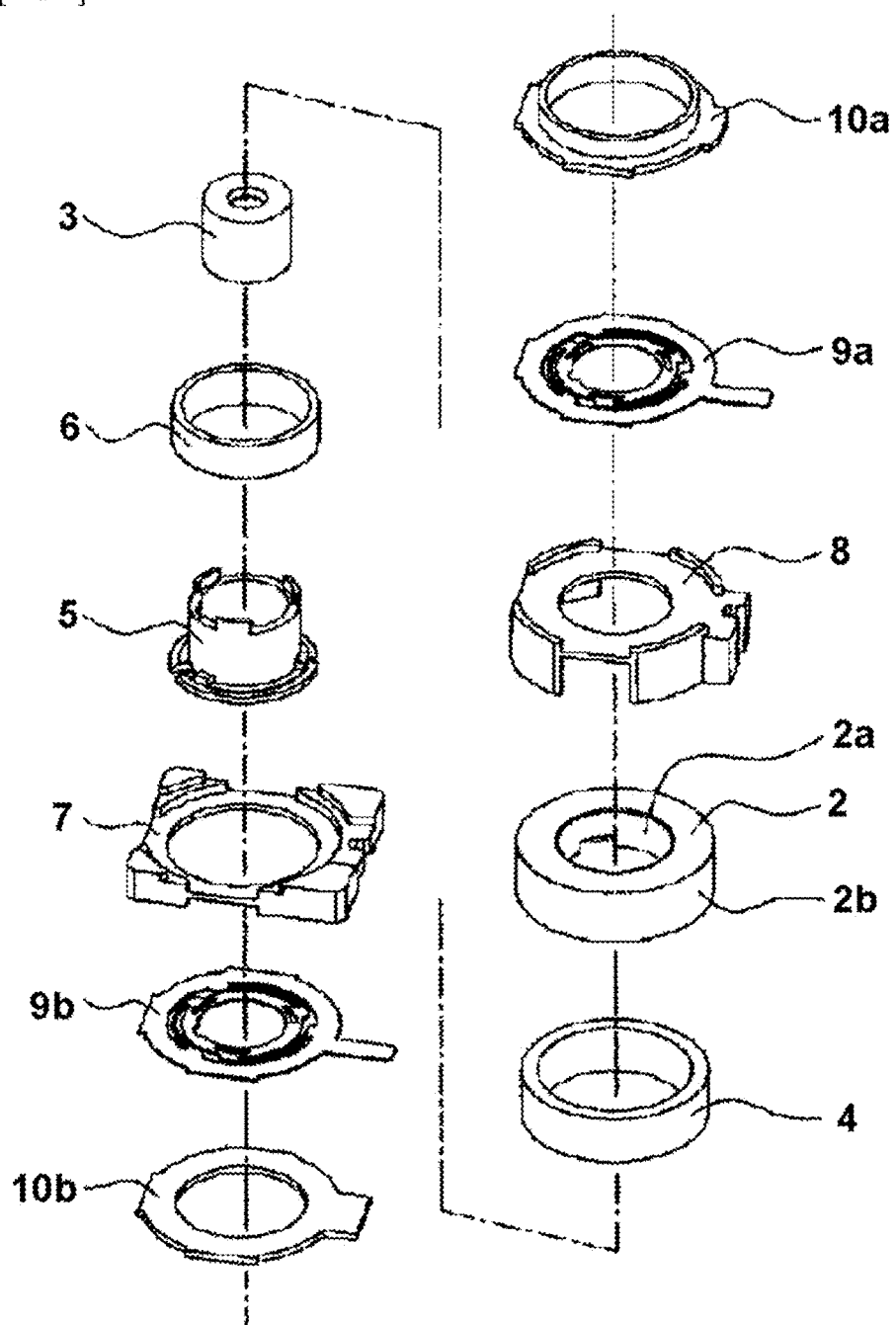

[FIG. 6]
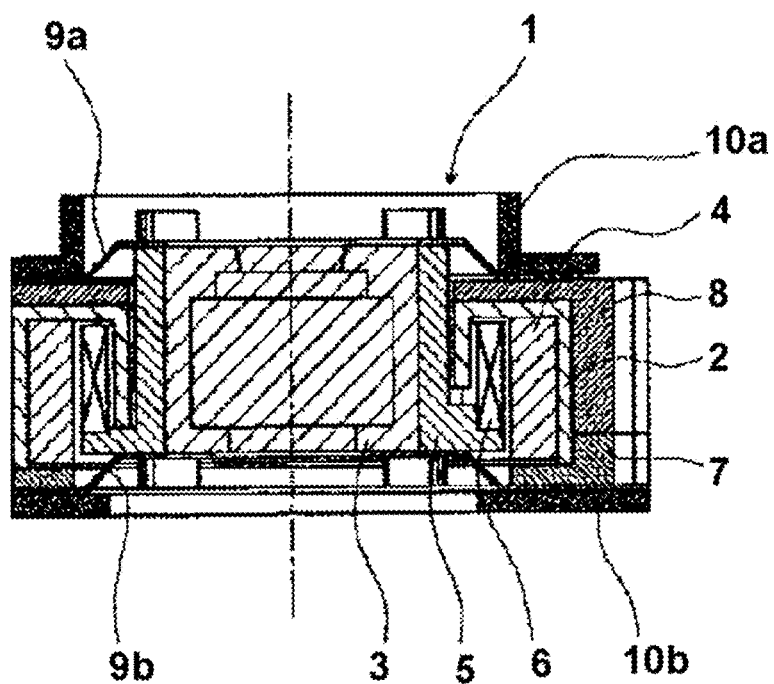

[FIG. 7]
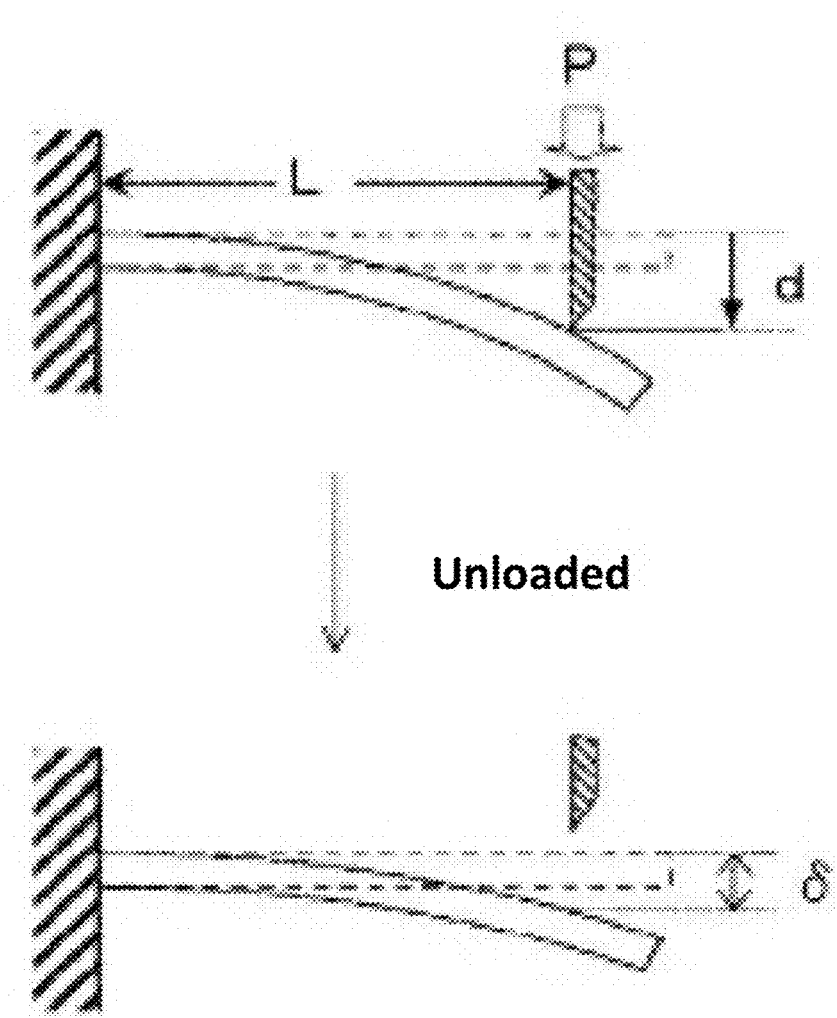

HIGH STRENGTH TITANIUM COPPER STRIP AND FOIL HAVING LAYERED STRUCTURE

TECHNICAL FIELD

The present invention relates to a titanium copper that has improved strength and improved settling resistance, and is suitable for use in a conductive spring material, in particular for autofocus camera modules and the like, a method for producing the titanium copper, a copper rolled product, an electronic device part and an autofocus camera module.

BACKGROUND ART

An electronic part called an autofocus camera module is used in camera lens sections for mobile phones. An autofocus function of a camera for a mobile phone moves a lens in a fixed direction by spring force of a material used for an autofocus camera module, while moving the lens in a direction opposite to the spring force-acting direction by means of electromagnetic force generated by passing an electric current through a coil wound around the periphery. By such a mechanism, the camera lens is driven to exert the autofocus function (for example, Patent Documents 1 and 2).

Therefore, a copper alloy foil for use in the autofocus camera modules requires spring strength sufficient to withstand deformation of the material due to the electromagnetic force. If the spring strength is low, the material cannot withstand displacement due to the electromagnetic force, and permanent deformation (settling) will occur so that the copper alloy foil cannot return to its initial position after unloading the electromagnetic force. If the settling occurs, the lens cannot move to a desired position and the autofocus function cannot be produced, when a constant current is passed.

For the autofocus camera modules, Cu—Ni—Sn based copper alloy foils having a foil thickness of 0.1 mm or less and tensile strength or 0.2% yield strength of 1100 MPa or more have been used.

However, a recent demand for cost reduction has led to the use of titanium copper foils which have relatively low raw material costs than the Cu—Ni—Sn based copper alloys, and the demand for the titanium copper foil is thus increasing.

On the other hand, the strength of the titanium copper foil is lower than that of the Cu—Ni—Sn based copper alloy foil, causing a problem that settling occurs. Therefore, there is a need for increasing the strength of the titanium copper foil.

Means for increasing the strength of titanium copper includes, for example, those described in Patent Documents 3 and 4. Patent Document 3 proposes a method for producing titanium copper through the steps of a solutionizing treatment, a sub-aging treatment, cold rolling, and an aging treatment, in which a heat treatment after the solutionizing treatment is divided into two stages, thereby increasing a range of Ti concentration (concentration difference) due to spinodal decomposition and improving a balance between strength and bending workability. Patent Document 4 also discloses that it is effective to increase the fluctuation of Ti concentration by a method for producing titanium copper through the steps of a solutionizing treatment, a preliminary aging treatment, an aging treatment, finish rolling, and strain relief annealing.

Other techniques for further improving the strength of titanium copper include those described in Patent Documents 5 to 8. Patent Document 5 discloses a method of adjusting an average crystal grain size by final recrystallization annealing, and then carrying out cold rolling and an aging treatment in this order. Patent Document 6 discloses that cold rolling, an aging treatment and cold rolling are sequentially carried out after a solutionizing treatment. Patent Document 7 discloses a method of adjusting an X-ray diffraction intensity of {420} on a plate surface by sequentially carrying out hot rolling and cold rolling, followed by a solutionizing treatment in which a temperature is maintained in a temperature range of from 750 to 1000° C. for 5 seconds to 5 minutes, and followed by cold rolling at a rolling ratio of 0 to 50%, an aging treatment at 300 to 550° C. and finish cold rolling at a rolling ratio of 0 to 30%. Patent Document 8 proposes a method of adjusting a half-width of an X-ray diffraction strength of {220} on a rolled surface by sequentially carrying out a first solutionizing treatment, intermediate rolling, a final solutionizing treatment, annealing, final cold rolling, and an aging treatment under predetermined conditions.

Further, in order to suppress generation of settling in addition to increasing the strength, Patent Document 9 discloses a method of controlling a surface roughness of a copper alloy foil by sequentially carrying out hot rolling and cold rolling, followed by a solutionizing treatment, cold rolling at a rolling reduction ratio of 55% or more, an aging treatment at 200 to 450° C. and cold rolling at a rolling reduction ratio of 35% or more. Patent Document 10 discloses that a ratio I(220)/I(311) is controlled by sequentially carrying out hot rolling and cold rolling, followed by a solutionizing treatment, cold rolling at a rolling reduction ratio of 55% or more, an aging treatment at 200 to 450° C., cold rolling at a rolling reduction ratio of 50% or more, and optionally strain relief annealing, such that the rolling reduction ratio of the cold rolling after the solutionizing treatment is controlled. Each of Patent Document 9 and Patent Document 10 discloses that the titanium copper foil can achieve 0.2% yield strength of 1100 MPa or more in a direction parallel to the rolling direction.

Furthermore, Patent Document 11 proposes that Young's modulus is decreased by carrying out hot rolling at 800 to 1000° C. to a thickness of 5 to 20 mm, cold rolling at a working ratio of 30 to 99%, pre-annealing at a softening degree of 0.25 to 0.75 by maintenance in a temperature range of from 500 to 650° C. for 5 to 80 seconds at an average temperature rising rate of 400 to 500° C. of 1 to 50° C./sec, cold rolling at a working ratio of 7 to 50%, a solutionizing treatment at 700 to 900° C. for 5 to 300 seconds, and an aging treatment at 350 to 550° C. for 2 to 20 hours.

Further, as a technique focusing on structural control, Patent Document 12 discloses a method of improving a balance between strength and conductivity by subjecting a titanium copper having a composition containing Ti in a range of 0.5% by mass or more and 3.5% by mass or less, the balance being Cu and inevitable impurities, to finish cold or hot rolling at a rolling reduction ratio of more than 90% and an aging treatment to form a lamellar structure after the aging treatment.

PRIOR ART DOCUMENT

Patent Document 1: Japanese Patent Application Publication No. 2004-280031 A

Patent Document 2: Japanese Patent Application Publication No. 2009-115895 A
[Patent Document 3: Japanese Patent Application Publication No. 2015-098622 A
Patent Document 4: Japanese Patent Application Publication No. 2015-127438 A
Patent Document 5: Japanese Patent No. 4001491 B
Patent Document 6: Japanese Patent No. 4259828 B
Patent Document 7: Japanese Patent Application Publication No. 2010-126777 A
Patent Document 8: Japanese Patent Application Publication No. 2011-208243 A
Patent Document 9: Japanese Patent No. 5723849 B
Patent Document 10: Japanese Patent No. 5526212 B
Patent Document 11: Japanese Patent Application Publication No. 2014-074193 A
Patent Document 12: Japanese Patent Application Publication No. 2014-173145 A

SUMMARY OF INVENTION

Problem to be Solved by the Invention

Main objects of Patent Documents 3 and 4 are to improve the strength and bending workability of the titanium copper, but these documents do not focus on the problem of settling. In addition, the titanium copper described in each of Patent Document 3 and Patent Document 4 has a strength of about 900 to 1200 MPa, so that it may not be used in applications that require high strength such as autofocus modules.

In some Examples and Comparative Examples described in the specifications of Patent Documents 5 to 8, some titanium copper having a 0.2% proof stress of 1100 MPa or more can be found. However, the present inventors have found that the conventional techniques proposed in Patent Documents 5 to 8 causes settling when a material is loaded, deformed and then unloaded, so that only high strength cannot allow the use of the titanium copper as a conductive spring material for autofocus camera modules or the like.

Patent Documents 9 to 11 focus on the problem of settling and propose a method of suppressing the generation of settling. However, it has been found that in the proposed techniques of Patent Documents 9 to 11, the foil having a relatively thin thickness does not produce effects enough to be expected. That is, it has been found that although the proposed techniques of Patent Documents 9 to 11 produce a significant effect for the foil having somewhat thick foil thickness, the foil having a thinner thickness does not produce a sufficient effect to be expected from the foil having the thicker foil thickness.

Further, Patent Document 12 mentions that the strength increases due to the lamellar structure. However, the titanium copper described in Patent Document 12 may have a low strength and may be broken in applications requiring higher strength, which will cause a problem that the titanium cupper will not function as a spring. Therefore, it is not appropriate in terms of achieving both strength and settling suppression.

An object of the present invention is to solve such problems, and is to provide a titanium copper that has required high strength when used as a spring, has decreased settling and is used as a conductive spring material employed for electronic device components such as autofocus camera modules, a method for producing the titanium copper, a copper rolled product, an electronic device part and an autofocus camera module.

Means for Solving the Problem

As a result of studies for effects of a metal structure on settling, the present inventors have found that a certain fine layered structure of Cu and Ti in the metal structure is effective for suppressing settling and increasing the strength. Further, the present inventors have found that such a fine layered structure of Cu and Ti can be obtained by adjusting pre-annealing conditions prior to hot rolling.

Based on such findings, a titanium copper according to the present invention contains from 1.5 to 5.0% by mass of Ti, the balance being of Cu and inevitable impurities, wherein the titanium copper has a layered structure of Cu and Ti where in a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in the thickness direction, and wherein in the cross section parallel to the rolling direction, a Ti concentration difference in the layered structure is 3% by mass or more, the Ti concentration difference being a difference between a maximum value of the Ti concentration in the higher concentration Ti layer and a minimum value of the Ti concentration in the lower concentration Ti layer.

Here, in the titanium copper according to the present invention, the Ti concentration difference in the layered structure is preferably from 3 to 50% by mass.

The titanium copper according to the present invention preferably has a tensile strength of 1100 MPa or more in the direction parallel to the rolling direction.

The titanium copper according to the present invention further may contain one or more elements selected from Ag, B, Co, Fe, Mg, Mn, Mo, Ni, P, Si, Cr and Zr in a total amount of from 0 to 1.0% by mass.

The present invention further provides an electronic device part comprising any one of the titanium copper as described above. It is preferable that the electronic device part is an autofocus camera module.

The present invention further provides an autofocusing camera module comprising: a lens; a spring member for elastically biasing the lens to an initial position in an optical axis direction; and an electromagnetic driver configured to generate electromagnetic force for withstanding the biasing force of the spring member so that the lens can be driven in the optical axis direction, wherein the spring member comprises any one of the titanium copper as described above.

Effects of the Invention

According to the present invention, it is possible to obtain a Cu—Ti based alloy having high strength and decreased settling, which can be suitably used as a conductive spring material for use in electronic device parts such as autofocus camera modules.

BRIEF DESCRIPTION OF DRAWINGS

FIG. 1 is a Ti mapping view obtained by performing STEM-EDX analysis on a cross section parallel to a rolling direction of titanium copper according to one embodiment of the present invention.

FIG. 2 is a schematic view of a graph showing a Ti concentration curve in a thickness direction of a cross section parallel to a rolling direction, which is obtained by performing line analysis with STEM-EDX on a cross section parallel to the rolling direction of titanium copper according to one embodiment of the present invention.

FIG. 3 is a Ti mapping view obtained by performing STEM-EDX analysis on a cross section parallel to a rolling direction of conventional titanium copper.

FIG. 4 is a cross-sectional view showing an autofocus camera module according to the present invention.

FIG. 5 is an exploded perspective view of the autofocus camera module in FIG. 4.

FIG. 6 is a cross-sectional view showing the operation of the autofocus camera module in FIG. 4.

FIG. 4 shows an example of measurement results of a solder adhesive strength test.

FIG. 7 is a schematic view showing a method for measuring an amount of settling.

MODES FOR CARRYING OUT THE INVENTION

A titanium copper according to the present invention contains from 1.5 to 5.0% by mass of Ti, the balance being of Cu and inevitable impurities, and is in the form of a foil or strip. The titanium copper has a layered structure of Cu and Ti where in a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in the thickness direction. In the cross section parallel to the rolling direction, a Ti concentration difference in the layered structure is 3% by mass or more, the Ti concentration difference is defined as a difference between a maximum value of the Ti concentration in the higher concentration Ti layer and a minimum value of the Ti concentration in the lower concentration Ti layer.

(Ti Concentration)

The titanium copper according to the present invention has a Ti concentration of from 1.5 to 5.0% by mass. For the titanium copper, the strength and conductivity is increased by allowing solid solution of Ti into the Cu matrix with a solutionizing treatment and then dispersing fine precipitates in the alloy with an aging treatment.

If the Ti concentration is less than 1.5% by mass, the precipitation of precipitates will become insufficient and the desired strength cannot be obtained. If the Ti concentration exceeds 5.0% by mass, the workability will deteriorate and the material will be easily cracked during rolling. In view of the balance between the strength and the workability, the Ti concentration may be preferably from 2.5 to 4.5% by mass.

(Other Additive Elements)

The strength of the titanium copper according to one embodiment of the present invention can be further improved by containing one or more of Ag, B, Co, Fe, Mg, Mn, Mo, Ni, P, Si, Cr, and Zr in the total amount of from 0 to 1.0% by mass. The total content of these elements may be zero, that is, these elements may not be contained. The reason why the upper limit of the total content of these elements is 1.0% by mass is that if it is more than 1.0% by mass, the workability is deteriorated and the material is easily cracked during rolling. In view of the balance between strength and workability, it is preferable to contain the above elements in the total amount of from 0.005 to 0.5% by mass.

(Tensile Strength)

The titanium copper according to the present invention can achieve a tensile strength in a direction parallel to a rolling direction of 1100 MPa or more, or even 1200 MPa or more. The tensile strength in the direction parallel to the rolling direction of 1200 MPa or more is a desirable characteristic for use as a conductive spring material for autofocus camera modules. In a preferred embodiment, both of tensile strengths in the direction parallel to the rolling direction and the direction perpendicular to the rolling direction are 1300 MPa or more, and in a more preferred embodiment, both are 1400 MPa or more.

On the other hand, the upper limit of the tensile strength is not particularly limited in terms of the strength intended by the present invention, but the tensile strengths in the directions parallel and perpendicular to the rolling direction are generally 2000 MPa or less, and typically 1800 MPa or less, taking labor and costs into account.

In the present invention, the tensile strength of the titanium copper in the direction parallel to the rolling direction is measured in accordance with JIS Z2241:2011 (Metal Material Tensile Test Method).

(Layered Structure of Cu and Ti)

As illustrated in FIGS. 1 and 2, when performing analysis on the cross section in the direction parallel to the rolling direction by an energy dispersive X-ray spectroscopy (EDX) with a scanning transmission electron microscope (STEM) (STEM-EDX analysis), the titanium copper according to an embodiment of the present invention has a layered structure of Cu and Ti in which a lower concentration Ti layer having a Ti concentration less than an average concentration and a higher concentration Ti layer having a Ti concentration equal to or higher than the average concentration are alternately present in the thickness direction (the up and down direction in FIG. 1), in the cross section parallel to the rolling direction.

The stable and continuous presence of such a layered structure of Cu and Ti in the cross section parallel to the rolling direction enhances resistance to deflection and makes it difficult to generate permanent deformation, so that it would allow settling to be effectively suppressed even if the copper foil has a thin thickness of 0.1 mm or less, although this invention is not limited to such a theory.

The "layered structure" is defined as a structure in which the lower concentration Ti layer and the higher concentration Ti layer are alternately present, and each layer is continuous over 50 nm or more in the rolling direction. A structure having a length less than 50 nm in the rolling direction is defined as a speckled structure.

On the other hand, as shown in FIG. 3, the conventional titanium copper has a discontinuous and speckled distribution of a portion having a higher Ti concentration and a portion having a lower Ti concentration in the cross section parallel to the rolling direction, and has substantially uniform peak values for Ti concentrations in the thickness direction. In this case, the titanium copper having a thinner thickness has a discontinuous structure. Therefore, it does not have strong resistance against deflection, and easily generates permanent deformation within the elastic limit, so that the settling would be sufficiently suppressed.

Further, as an index representing the layered structure of Cu and Ti, a Ti concentration difference in the layered structure can be defined. This analysis is also performed by STEM-EDX analysis. When linear analysis of a cross section parallel to the rolling direction is performed by STEM- EDX in the thickness direction, the Ti concentration at each measurement point varies depending on the Ti concentration. In the present invention, the Ti concentration is observed per one visual field (at magnifications of 1,000,000; observation visual field: 140 nm×140 nm), and a Ti concentration curve with respect to a distance in the thickness direction is obtained as shown in FIG. 2. The higher concentration Ti layer and the lower concentration Ti layer in the Ti concentration curve are applied mutatis mutandis by replacing the contour curve for the surface properties as defined in JIS B0601 with the Ti concentration curve. That is, the higher concentration Ti layer is defined as an upper portion where the Ti concentration becomes higher than the average value of the Ti concentration curve, among curve portions sandwiched between adjacent two intersections in an X axis direction when the Ti concentration curve is divided by an X axis (average values in the Ti concentration curve). Also, the lower concentration Ti layer is defined as a lower portion where the Ti concentration becomes lower than the average value of the Ti concentration curve, among curve portions sandwiched between adjacent two intersections in an X axis direction when the Ti concentration curve is divided by an X axis (average values in the Ti concentration curve).

Then, from the Ti concentration curve, a difference (a Ti concentration difference in the layered structure) is determined between an average value of the five Ti concentrations from the highest Ti concentration among points where the Ti concentration of each higher concentration Ti layer is the highest, and an average value of the five Ti concentrations from the lowest Ti concentration among points where the Ti concentration of each lower concentration Ti layer is the lowest. It should be noted that since the layered structure of Cu and Ti is exhibited in parallel to the rolling direction, the above line analysis is necessarily performed in the thickness direction of the titanium copper.

As described above, when analyzing and measuring the cross section parallel to the rolling direction with STEM-EDX, the titanium copper according to the present invention has a Ti concentration difference of 3% by mass or more, preferably 4% by mass or more, more preferably 7% by mass or more, in the layered structure in the cross section parallel to the rolling direction. If the concentration difference is too low, it will be difficult to achieve both strength and settling suppression. On the other hand, although there is no demerit due to the concentration difference being too high, if the concentration difference exceeds a certain level, the effect of increasing strength or suppressing settling tends to be saturated. Therefore, the concentration difference should be controlled between 3% by mass and 50% by mass.

(Thickness of Titanium Copper)

The titanium copper according to the present invention has a thickness of, for example, 0.1 mm or less, and in a typical embodiment, a thickness of from 0.018 mm to 0.08 mm, and in a more typical embodiment, a thickness of from 0.02 mm to 0.06 mm.

(Production Method)

To produce the titanium copper as described above, raw materials such as electrolytic copper and Ti are first melted in a melting furnace to obtain a molten metal having a desired composition. The molten metal is then fed to a casting space of a mold where the molten metal is cast into an ingot. In order to prevent oxidative wear of titanium, the melting and casting are preferably carried out in a vacuum or in an inert gas atmosphere.

Here, in order to obtain the above predetermined layered structure of Cu and Ti of the titanium copper, it is important to adjust the mold and annealing conditions prior to hot rolling. By adjusting the pre-annealing conditions, the Ti concentration difference in the layered structure can be controlled.

The thickness of the mold is not specified, but it is desirable to adjust the thickness to the same level as that of the ingot. The thickness of a peripheral wall portion of the mold is measured along a direction parallel to the thickness of the ingot.

A suitable material of the peripheral wall portion of the mold can be refractory brick. Conventionally, cast iron or copper has been used as the material of the peripheral wall portion of the mold. However, by replacing this with the refractory brick, a cooling rate after feeding the molten metal can be reduced, thereby allowing slow cooling of the ingot.

Typically, the ingot is then subjected to preliminary annealing, hot rolling, cold rolling 1, a solutionizing treatment, cold rolling 2, an aging treatment, cold rolling 3, and strain relief annealing in this order to finish the ingot in the form of a foil or strip having desired thickness and properties. However, the cold rolling 3 and/or the strain relief annealing may be omitted depending on circumstances.

The pre-annealing is an important heat treatment for adjusting the Ti concentration difference in the layered structure of Cu and Ti. An excessively high temperature or an excessively low temperature cannot produce the Ti concentration difference. Therefore, the pre-annealing temperature is preferably from 600 to 950° C., more preferably from 625 to 925° C., even more preferably from 650 to 900° C. Further, if the pre-annealing time is too short or too long, it will be difficult to achieve both strength and settling suppression. Therefore, the pre-annealing time is preferably from 1 to 12 hours, preferably from 2 to 11 hours, more preferably from 3 hours to 10 hours.

The hot rolling and the subsequent cold rolling may be carried out under conventional conditions used in the production of the titanium copper, and there are no special requirements herein. The solutionizing treatment may be carried out under conventional conditions, for example, at 700 to 1000° C. for 5 seconds to 30 minutes.

To obtain high strength, the cold rolling 2 can be carried out after the solutionizing treatment. The rolling reduction ratio of the cold rolling 2 is preferably 90% or more, and more preferably 95% or more. If the rolling reduction ratio is less than 90%, it will be difficult to obtain a tensile strength of 1100 MPa or more. The upper limit of the rolling reduction ratio is not particularly limited from the viewpoint of the strength intended by the present invention, but it does not industrially exceed 99.8%.

The aging treatment is carried out at a temperature of from 200 to 450° C. for a heating time of from 2 hours to 20 hours. If the heating temperature is lower than 200° C. or higher than 450° C., it will be difficult to obtain a tensile strength of 1100 MPa or more. If the heating time is less than 2 hours or more than 20 hours, it will be difficult to obtain a tensile strength of 1100 MPa or more.

Depending on the intended strength, the cold rolling 3 can be carried out after the aging treatment. The rolling reduction ratio of the cold rolling 3 is preferably 35% or more, more preferably 50% or more, and still more preferably 70% or more. In addition, when the cold rolling 3 is unnecessary, it can also be omitted.

Further, according to the purpose such as removal of residual strain, the cold rolling 3 can be followed by strain relief annealing at 200 to 500° C. for 1 to 5 minutes. When the strain relief annealing is unnecessary, it also can be omitted.

In general, after the heat treatment, the surface may be washed with an acid or polished to remove an oxide film or an oxide layer formed on the surface. In the present invention, the surface also can be washed with an acid or polished after the heat treatment.

(Application)

The titanium copper according to the present invention can be suitably used as a material for electronic device parts, including, but not limited to, switches, connectors, jacks, terminals and relays, in particular as a conductive spring member for use in electronic device parts such as autofocus camera modules.

In one embodiment, the autofocus camera module includes: a lens; a spring member for elastically biasing the lens to an initial position in an optical axis direction; and an electromagnetic drive means configured to generate electromagnetic force for withstanding the biasing force of the spring member so that the lens can be driven in the optical axis direction. By way of example, the electromagnetic driving means includes: a U-shaped cylindrical yoke; a coil housed inside an inner peripheral wall of the yoke; and a magnet enclosing the coil and housed inside the outer peripheral wall of the yoke.

FIG. 4 is a cross-sectional view showing an example of the autofocus camera module according to the present invention, FIG. 5 is an exploded perspective view of the autofocus camera module in FIG. 4, and FIG. 6 is a cross-sectional view showing the operation of the autofocus camera module in FIG. 4.

An autofocus camera module 1 includes: a U-shaped cylindrical yoke 2; a magnet 4 attached to an outer wall of the yoke 2; a carrier 5 provided with a lens 3 in a central position; a coil 6 attached to the carrier 5; a base 7 to which the yoke 2 is attached; a frame 8 supporting the base 7; two spring members 9a, 9b for supporting the carrier 5 at the upper and lower positions; and two caps 10a, 10b covering these upper and lower positions. These two spring member 9a, 9b are the same articles, and support the carrier 5 by holding it from the upper and lower positions in the same positional relationship, while functioning as a power supply route to the coil 6. The carrier 5 moves upward by applying an electric current to the coil 6. It should be noted that the wordings "upper" and "lower" are used herein as needed, and they refer to upper and lower in FIG. 4 and the upper represents a positional relationship that is directed from the camera to a subject.

The yoke 2 is a magnetic material such as soft iron, and assumes a U-shaped cylindrical shape whose upper surface portion is closed, and has cylindrical inner wall 2a and outer wall 2b. A ring-shaped magnet 4 is attached (adhered) to the inner surface of the U-shaped outer wall 2b.

The carrier 5 is a molded product made of a synthetic resin or the like, which has a cylindrical structure with a bottom portion, and the carrier 5 supports the lens in the central position, and binds the pre-formed coil 6 onto the bottom surface outwardly so that the coil 6 is mounted thereon. The yoke 2 is integrated by fitting it to the inner periphery of the base 7 which is a rectangular resin molded article, and the whole yoke 2 is further secured by the frame 8 which is a resin molded article.

The spring members 9a, 9b are fixed by holding their outermost peripheral portions by the frame 8 and the base 7, respectively, and the cutout grooves arranged per 120° on the inner peripheral portion are fitted to the carrier 5 and fixed by thermal caulking or the like.

The spring member 9b and the base 7 as well as the spring member 9a and the frame 8 are fixed by adhesive and thermal caulking, respectively, and further the cap 10b is attached to the bottom surface of the base 7, and the cap 10a is attached to the upper portion of the frame 8, and the spring member 9b is sandwiched between the base 7 and the cap 10b and the spring member 9a is sandwiched between the frame 8 and the cap 10a, so that they are adhered.

The lead wire of one of the coils 6 is extended upward passing through the groove provided on the inner peripheral surface of the carrier 5, and soldered to the spring member 9a. The other lead wire is extended downward passing through the groove provided on the bottom surface of the carrier 5, and soldered to the spring member 9b.

The spring members 9a, 9b are plate springs made of the titanium copper according to the present invention. They have spring properties and elastically energize the lens 3 to the initial position in the optical axis direction. At the same time, they also act as power supply paths to the coil 6. One position on the outer peripheral portion of each of the spring members 9a, 9b projects outward, thereby acting as a power supply.

The cylindrical magnet 4 is magnetized in the radial (diameter) direction and forms a magnetic path passing through an inner wall 2a, an upper surface portion and an outer wall 2b of the U-shaped yoke 2, and the coil 6 is disposed in the gap between the magnet 4 and the inner wall 2a.

The spring members 9a, 9b have the same shape, and are attached in the same positional relationship as shown in FIGS. 4 and 5, so that any axial deviation can be suppressed when the carrier 5 is moved upward. Since the coil 6 is manufactured by pressure molding after winding, the accuracy of the finished outer diameter of the coil can be improved, thereby allowing the coil to be easily arranged in a predetermined narrow gap. The carrier 5 is butted to the base 7 at the lowest position and butted to the yoke 2 at the uppermost position, and it will be thus equipped with the butting mechanisms in the upper and bottom vertical direction, thereby preventing any detachment.

FIG. 6 shows a sectional view when upwardly moving the carrier 5 having the lens 3 for the autofocus by applying an electric current to the coil 6. When a voltage is applied to the power supply terminals of the spring members 9a, 9b, the electric current flows through the coil 6, and the upward electromagnetic force acts on the carrier 5. On the other hand, restoring force of two linked spring members 9a, 9b downwardly acts on the carrier 5. Therefore, the distance of upward movement of the carrier 5 will be a position where the electromagnetic force and the restoring force are balanced. This will allow determination of the moving amount of the carrier 5 according to the amount of the electric current applied to the coil 6.

Since the upper spring member 9a supports the upper surface of the carrier 5 and the lower spring member 9b support the lower surface of the carrier 5, the restoring force will equally work downward on the upper and lower surfaces of the carrier 5, so that any axial displacement of the lens 3 can be suppressed.

Therefore, for the upward movement of the carrier 5, no guide by ribs and the like is needed and used. Since there is no sliding friction by the guide, the amount of movement of the carrier 5 will be purely controlled by the balance between the electromagnetic force and the restoring force, thereby achieving the smooth and accurate movement of the lens 3. This will achieve autofocusing with reduced blurring of the lens.

It should be noted that although the magnet 4 has been described as one having the cylindrical shape, the magnet is not limited to this shape, and may be divided 3 to 4 parts and magnetized in the radial direction, which may be fixed by adhering to the inner surface of the outer wall 2b of the yoke 2.

EXAMPLES

Hereinafter, Examples of the present invention will be illustrated, but these Examples are presented in order to provide better understanding of the present invention and its advantages, and in no way intended to limit the present invention.

Each alloy containing the alloy components shown in Table 1, the balance being copper and inevitable impurities, was used as an experimental material, and effects of the alloy components and production conditions on tensile strength and settling were studied.

<Production Conditions>

First, 2.5 kg of electrolytic copper was melted in a vacuum melting furnace, and alloy elements were added such that each alloy composition as shown in Table 1 was obtained. The molten metal was cast into a mold as shown below to produce an ingot having a thickness of 30 mm, a width of 60 mm, and a length of 120 mm. The ingot was processed in the following step order to produce each product sample having the predetermined thickness as shown in Table 1.

(1) Melting Casting: The casting temperature was 1300° C., the mold was selected from refractory brick, cast iron, and copper, and the cooling rate during casting was changed. The cooling rate is higher in the order of copper, cast iron, and refractory brick. The mold thickness was 30 mm.

(2) Pre-annealing: Pre-annealing conditions were as shown in Table 1.

(3) Hot Rolling: The above ingot was further heated at 950° C. for 3 hours and rolled to a thickness of 10 mm.

(4) Grinding: The oxide scale produced in hot rolling was removed by a grinder. The thickness after grinding was 9 mm.

(5) Cold rolling 1: The ingot was rolled to a predetermined thickness depending on the rolling reduction ratio.

(6) Solutionizing Treatment: The sample was charged with an electric furnace 1 heated to 800° C. and maintained for 5 minutes, and the sample was quenched by placing it in a water bath.

(7) Cold Rolling 2: With regard to the sample that did not carry out the cold rolling 3 below, it was rolled at the rolling reduction ratio as shown in Table 1 to the product thickness as shown in Table 1.

(8) Aging Treatment: The sample was heated in an Ar atmosphere under the conditions as shown in Table 1.

(9) Cold Rolling 3: With regard to the sample that carried out the cold rolling 3, it was rolled at the rolling reduction ratio as shown in Table 1 to the product thickness as shown in Table 1. In addition, the sample that did not carried out the cold rolling 3 was indicated as "-".

(10) Strain Relief Annealing: After carrying out the cold rolling 2 or the cold rolling 3, the sample was placed in an electric furnace heated to 400° C. and maintained for 10 seconds, and the sample was then placed in a water bath and rapidly cooled. Table 1 shows the temperature and time of the strain relief annealing for the samples subjected to the strain relief annealing, and indicates the sample that did not carried out it as "-".

The following evaluations were performed for each product sample produced as described above.

<Tensile Strength>

The tensile strength in the direction parallel to the rolling direction was measured in accordance with JIS Z2241:2011 using a tensile tester according to the measurement method as described above.

<Settling>

Each strip sample having a width of 15 mm and a length of 25 mm was collected such that the longitudinal direction was parallel to the rolling direction, and, as shown in FIG. 7, one end of the sample was fixed, and a punch with a tip processed into a knife edge was pressed at a moving rate of 1 mm/min at a position of a distance L from that fixed end to provide the sample with deflection of the distance d. The punch was then returned to its initial position and unloaded. After unloading, an amount of settling δ was determined.

The test conditions were L=3 mm and d=2 mm when the foil thickness of the sample was 0.05 mm or less, and L=5 mm and d=4 mm when the foil thickness was thicker than 0.05 mm. Further, the amount of settling was measured at a resolution of 0.01 mm, and when the settling was not detected, it was expressed as <0.01 mm.

<Structural Analysis>

As described above, the cross section parallel to the rolling direction was observed with STEM-EDX, and it was judged whether the structure was layered or speckled from the resulting image. The scanning transmission electron microscope used herein was JEM-2100F from JEOL, and the measurement conditions were a sample tilt angle of 0° and an acceleration voltage of 200 kV.

Further, the cross section parallel to the rolling direction was subjected to line analysis in the thickness direction by STEM-EDX, and the Ti concentration curve with respect to the distance in the thickness direction was obtained. Further, the Ti concentration difference in the layered structure was determined by analysis of the Ti concentration curve.

TABLE 1

| Example/Comparative Example | Product Thickness mm | Component | | Casting Conditions Mold | Pre-annealing before Hot Rolling |
|---|---|---|---|---|---|
| | | Ti | Sub-component | | |
| Example 1 | 0.03 | 3.2 | — | Refractory Brick | 600° C. × 2 h |
| Example 2 | 0.03 | 3.2 | — | Refractory Brick | 600° C. × 11 h |
| Example 3 | 0.03 | 3.2 | — | Refractory Brick | 600° C. × 12 h |
| Example 4 | 0.03 | 3.2 | 0.4% Cr | Refractory Brick | 750° C. × 6 h |
| Example 5 | 0.03 | 3.2 | 0.5% Mo | Refractory Brick | 850° C. × 3 h |
| Example 6 | 0.03 | 3.2 | 0.1% Mg | Refractory Brick | 800° C. × 5.5 h |
| Example 7 | 0.03 | 3.2 | 0.1% Zr | Refractory Brick | 950° C. × 1 h |
| Example 8 | 0.03 | 3.2 | 0.1% Ni | Refractory Brick | 950° C. × 12 h |

TABLE 1-continued

| Example | | | | | |
|---|---|---|---|---|---|
| Example 9 | 0.018 | 3.2 | 0.2% Fe | Refractory Brick | 750° C. × 6 h |
| Example 10 | 0.05 | 3.2 | 0.1% Ag | Refractory Brick | 750° C. × 6 h |
| Example 11 | 0.1 | 3.2 | 0.05% B | Refractory Brick | 750° C. × 6 h |
| Example 12 | 0.03 | 3.4 | — | Refractory Brick | 780° C. × 6 h |
| Example 13 | 0.03 | 3.6 | — | Refractory Brick | 820° C. × 6 h |
| Example 14 | 0.03 | 3.8 | — | Refractory Brick | 850° C. × 6 h |
| Example 15 | 0.03 | 4.0 | — | Refractory Brick | 770° C. × 6 h |
| Example 16 | 0.03 | 4.4 | — | Refractory Brick | 920° C. × 6 h |
| Example 17 | 0.03 | 3.2 | 0.2% Fe | Refractory Brick | 750° C. × 6 h |
| Example 18 | 0.03 | 3.2 | 0.1% Ag + 0.1% Co—0.1% Ni | Refractory Brick | 750° C. × 6 h |
| Example 19 | 0.03 | 3.2 | 0.05% Si—0.1% Ni—01.% Zr—0.1% Mg | Refractory Brick | 750° C. × 6 h |
| Example 20 | 0.03 | 3.2 | 0.05% B—0.5% Mo—0.4% Cr | Refractory Brick | 750° C. × 6 h |
| Example 21 | 0.03 | 3.2 | 0.1% Co | Refractory Brick | 750° C. × 6 h |
| Example 22 | 0.03 | 3.2 | 0.05% Si | Refractory Brick | 750° C. × 6 h |
| Comparative Example 1 | 0.03 | 3.2 | — | Refractory Brick | — |
| Comparative Example 2 | 0.03 | 3.2 | — | Refractory Brick | 550° C. × 6 h |
| Comparative Example 3 | 0.03 | 3.2 | — | Refractory Brick | 750° C. × 0.5 h |
| Comparative Example 4 | 0.03 | 3.2 | — | Refractory Brick | 1000° C. × 6 h |
| Comparative Example 5 | 0.03 | 3.2 | — | Refractory Brick | 800° C. × 20 h |
| Comparative Example 6 | 0.03 | 3.2 | — | Cast Iron | 750° C. × 6 h |
| Comparative Example 7 | 0.03 | 3.2 | — | Copper | 750° C. × 6 h |
| Comparative Example 8 | 0.03 | 1.4 | — | Refractory Brick | 750° C. × 6 h |
| Comparative Example 9 | 0.03 | 5.1 | — | Refractory Brick | 750° C. × 6 h |
| Comparative Example 10 | 0.03 | 3.2 | 0.1Si + 0.2Ni + 0.5Zr + 0.5Mg | Refractory Brick | 750° C. × 6 h |

| Example/Comparative Example | Cold Rolling 2 Working Ratio (%) | Cold Rolling 3 Working Ratio (%) | Stress Relief Annealing | Structure | Ti Concentration Difference (Higher Concentration Ti Layer Concentration – Lower Concentration Ti Layer Concentration) | Tensile Strength (Mpa) | Settling (mm) |
|---|---|---|---|---|---|---|---|
| Example 1 | 98 | — | — | Layered | 3.3 | 1334 | <0.01 |
| Example 2 | 98 | — | — | Layered | 4.2 | 1351 | <0.01 |
| Example 3 | 98 | — | — | Layered | 4.0 | 1370 | <0.01 |
| Example 4 | 98 | — | — | Layered | 8.0 | 1364 | <0.01 |
| Example 5 | 98 | — | — | Layered | 7.8 | 1382 | <0.01 |
| Example 6 | 98 | — | — | Layered | 7.2 | 1444 | <0.01 |
| Example 7 | 98 | — | — | Layered | 7.0 | 1470 | <0.01 |
| Example 8 | 98 | — | — | Layered | 4.2 | 1330 | <0.01 |
| Example 9 | 98 | — | — | Layered | 6.8 | 1450 | <0.01 |
| Example 10 | 98 | — | — | Layered | 6.5 | 1423 | <0.01 |
| Example 11 | 98 | — | — | Layered | 10.0 | 1426 | <0.01 |
| Example 12 | 98 | — | — | Layered | 22.0 | 1470 | <0.01 |
| Example 13 | 98 | — | — | Layered | 32.0 | 1498 | <0.01 |
| Example 14 | 98 | — | — | Layered | 38.0 | 1522 | <0.01 |
| Example 15 | 98 | — | — | Layered | 45.0 | 1533 | <0.01 |
| Example 16 | 98 | — | — | Layered | 49.8 | 1580 | <0.01 |
| Example 17 | 98 | — | — | Layered | 8.0 | 1450 | <0.01 |
| Example 18 | 98 | — | — | Layered | 9.2 | 1470 | <0.01 |
| Example 19 | 98 | — | — | Layered | 8.0 | 1425 | <0.01 |
| Example 20 | 98 | — | — | Layered | 11.3 | 1432 | <0.01 |
| Example 21 | 96 | 78 | — | Layered | 9.3 | 1428 | 0.05 |
| Example 22 | 96 | 78 | 400° C. × 10 sec | Layered | 8.0 | 1460 | 0.03 |
| Comparative Example 1 | 98 | — | — | speckled | — | 1390 | 0.07 |
| Comparative Example 2 | 98 | — | — | Layered | 2.5 | 1390 | 0.07 |
| Comparative Example 3 | 98 | — | — | Layered | 1.0 | 1320 | 0.1 |
| Comparative Example 4 | Cracking Occurred during Hot Rolling | | | | | | |
| Comparative Example 5 | Cracking Occurred during Hot Rolling | | | | | | |
| Comparative Example 6 | 98 | — | — | speckled | — | 1324 | 0.12 |
| Comparative Example 7 | 98 | — | — | speckled | — | 1311 | 0.12 |
| Comparative Example 8 | 98 | — | — | Layered | 1.2 | 826 | 1.1 |
| Comparative Example 9 | Cracking Occurred during Hot Rolling | | | | | | |
| Comparative Example 10 | Cracking Occurred during Hot Rolling | | | | | | |

In each of Examples 1 to 22, a layered structure having a Ti concentration difference of 3% by mass or more was obtained, so that both high strength and suppression of settling could be achieved.

In Comparative Example 1, the pre-annealing before hot rolling was not carried out, so that a speckled structure was formed and any Ti concentration difference in the layered structure could not be measured, resulting in large settling.

In Comparative Examples 2 and 3, the heating temperature in the preliminary annealing before hot rolling was lower or the heating time was shorter, so that the Ti concentration difference was low due to insufficient heating, resulting in settling.

In Comparative Example 4 and Comparative Example 5, the heating temperature in the pre-annealing before hot rolling was higher or the heating time was longer, so that overheating caused cracking during the hot rolling, and the sample could not be prepared and the strength and settling could not be measured.

In each of Comparative Example 6 and Comparative Example 7, the cooling was higher due to the material of the mold, so that the structure was not layered and settling occurred.

In Comparative Example 8, the Ti concentration of the matrix phase was lower, so that the strength was lower and settling occurred.

In Comparative Example 9, the titanium concentration was more than 5% by mass, so that cracking occurred during the hot rolling, and the sample could not be prepared and the strength and settling could not measured.

In Comparative Example 10, the total content of the sub-components was more than 1.0% by mass, so that cracking occurred during the hot rolling, and the sample could not be prepared and the strength and settling could not be measured.

What is claimed is:

1. A titanium copper containing from 1.5% by mass to 5.0% by mass of Ti, the balance being of Cu and inevitable impurities,
    wherein the titanium copper has a layered structure of Cu and Ti where in a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in the thickness direction, the layered structure being defined as a structure in which the lower concentration Ti layer and the higher concentration Ti layer are alternately present and each of the lower concentration Ti layer and the higher concentration Ti layer is continuous over 50 nm or more in the rolling direction, and
    wherein in the cross section parallel to the rolling direction, a Ti concentration difference in the layered structure is 3% by mass or more, the Ti concentration difference being a difference between a maximum value of the Ti concentration in the higher concentration Ti layer and a minimum value of the Ti concentration in the lower concentration Ti layer.

2. The titanium copper according to claim 1, wherein the Ti concentration difference in the layered structure is from 3% by mass to 50% by mass.

3. The titanium copper according to claim 1, wherein the titanium copper has a tensile strength of 1100 MPa or more in a direction parallel to the rolling direction.

4. The titanium copper according to claim 1, wherein the titanium copper further contains one or more elements selected from Ag, B, Co, Fe, Mg, Mn, Mo, Ni, P, Si, Cr, and Zr in a total amount of from 0% by mass to 1.0% by mass.

5. An electronic device part comprising the titanium copper according to claim 1.

6. The electronic device part according to claim 5, wherein the electronic device part is an autofocus camera module.

7. An autofocusing camera module comprising: a lens; a spring member for elastically biasing the lens to an initial position in an optical axis direction; and an electromagnetic driver configured to generate electromagnetic force for withstanding the biasing force of the spring member so that the lens can be driven in the optical axis direction, wherein the spring member comprises the titanium copper according to claim 1.

* * * * *